United States Patent
Gregory et al.

(10) Patent No.: US 7,231,957 B2
(45) Date of Patent: *Jun. 19, 2007

(54) SYSTEM AND METHOD FOR TERMINATION OF A WIRE ROPE

(75) Inventors: George Robert Gregory, P.O. Box 8912, Tyler, TX (US) 75711; Robert McClure Love, III, Tyler, TX (US)

(73) Assignee: George Robert Gregory, Flint, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/016,940

(22) Filed: Dec. 2, 2004

(65) Prior Publication Data

US 2005/0230076 A1    Oct. 20, 2005

Related U.S. Application Data

(63) Continuation-in-part of application No. 10/825,658, filed on Apr. 14, 2004.

(51) Int. Cl.
B23K 23/00    (2006.01)
B29B 13/00    (2006.01)

(52) U.S. Cl. .................. 164/54; 228/234.3; 249/86; 264/259; 264/271.1

(58) Field of Classification Search .............. 164/54; 249/86; 264/259, 265, 271.1; 425/116; 228/234.3
See application file for complete search history.

(56) References Cited

U.S. PATENT DOCUMENTS

| | | | |
|---|---|---|---|
| 2,038,535 A | 4/1936 | Brenizer | |
| 2,151,032 A | 3/1939 | Jensen | |
| 3,786,554 A * | 1/1974 | Little | ............ 29/461 |
| 3,844,601 A | 10/1974 | Rochester, Jr. | |
| 4,317,640 A * | 3/1982 | Peeling | ............ 403/36 |
| 4,405,083 A * | 9/1983 | Charlebois et al. | ........... 249/97 |
| 4,602,891 A * | 7/1986 | McBride | ............ 403/211 |
| 4,881,677 A * | 11/1989 | Amos et al. | ............ 228/33 |
| 5,211,500 A * | 5/1993 | Takaki et al. | ............ 403/269 |
| 5,499,448 A | 3/1996 | Tournier et al. | |
| 6,035,692 A | 3/2000 | Lucas | |

(Continued)

FOREIGN PATENT DOCUMENTS

ES    2 036 452    *    5/1993

*Primary Examiner*—Kuang Y. Lin
(74) *Attorney, Agent, or Firm*—Schultz & Associates

(57) ABSTRACT

The invention provides a termination for a wire rope made by a process of inserting one end of a wire rope into a mold and placing a crucible with a crucible opening over the mold. The mold opening is in fluid communication with the crucible opening. Exothermic metallic material is added to the crucible. The exothermic metallic material is ignited forming a molten material. The molten material flows into the mold around the wire rope forming a termination capable of sustaining a higher break force than the wire rope.

The invention also provides a termination for a wire rope made by a process with an adhesive.

The termination provides a socket for connecting wire rope to various types of equipment. The socket can include one or more frustroconical wedges for securely holding the wire rope and the termination in the connector. The socket body can also include a protection sled and various ways to connect to the equipment.

28 Claims, 9 Drawing Sheets

U.S. PATENT DOCUMENTS 6,156,975 A     12/2000  Roose
6,170,145 B1     1/2001  Lucas
6,316,125 B1 *  11/2001  Gaman et al. .............. 428/654

2002/0162683 A1  11/2002  Fujiwara
2004/0093714 A1   5/2004  Campbell
2004/0121658 A1   6/2004  Gloaguen

* cited by examiner

SECTION A-A

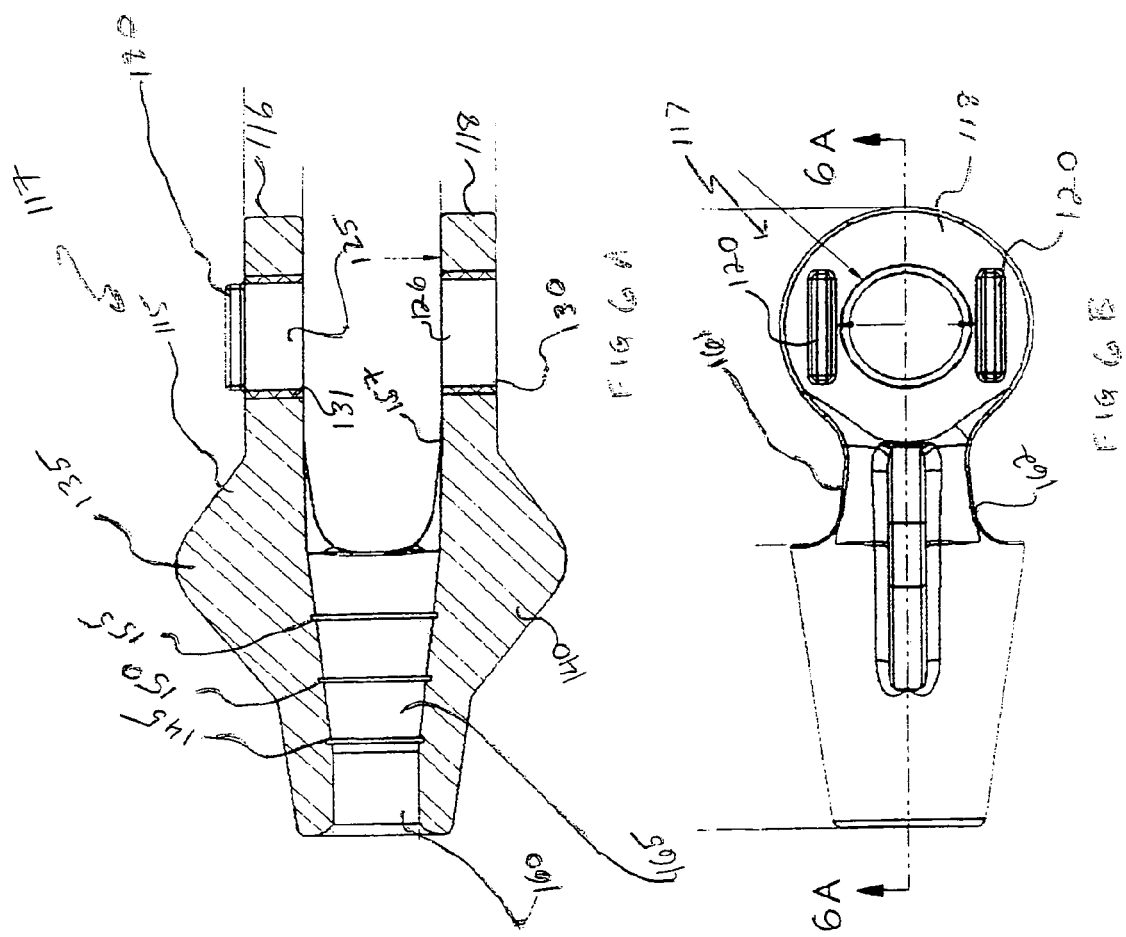

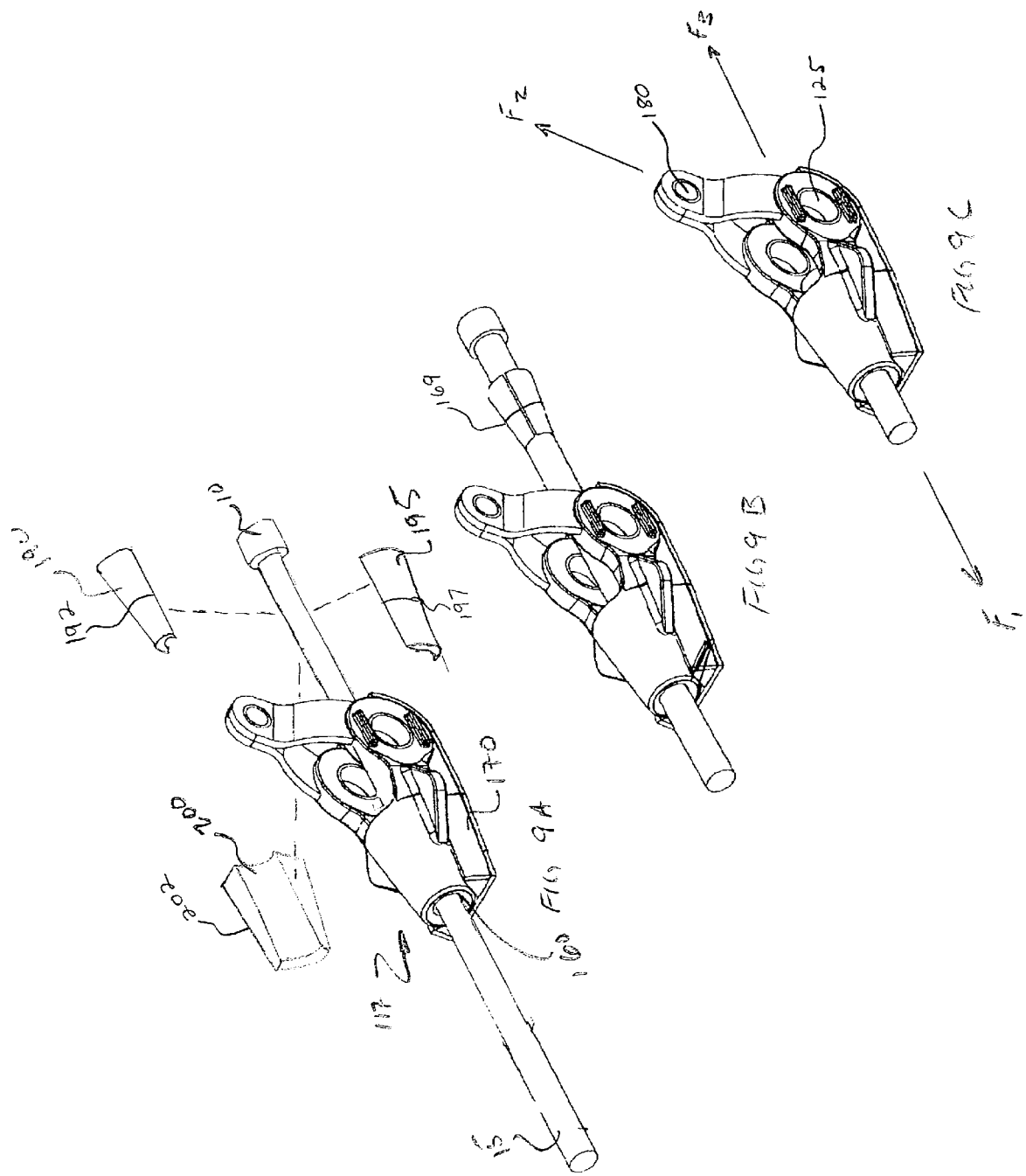

SYSTEM AND METHOD FOR TERMINATION OF A WIRE ROPE

FIELD OF THE INVENTION

This application is a continuation-in-part of U.S. patent application Ser. No. 10/825,658 filed on Apr. 14, 2004 entitled "Method for Making a Termination for a Wire Rope for Mining Equipment". The present invention relates to an apparatus and method for terminating a wire rope and connecting it to various pieces of equipment. In a preferred embodiment, the termination is used in association with a dump becket or socket in the field of mining.

BACKGROUND OF THE INVENTION

Methods for forming wire terminations and connections are taught in U.S. Pat. No. 6,170,145 to Lucas, U.S. Pat. No. 6,035,692 to Lucas; U.S. Pat. No. 2,151,032 to Jensen, U.S. Pat. No. 6,156,975 to Roose, U.S. Pat. No. 5,499,448 to Tournier, U.S. Pat. No. 3,844,601 to Rochester, U.S. Pat. No. 2,038,535 to Brenizer, Campbell U.S. Patent Publication No. 2004/0093714, Gloaguen U.S. Patent Publication No. 2004/0121658 and Fujiwara U.S. Patent Publication No. 2002/0162683.

A need has existed for a wire rope termination made by a fast process resulting in a light-weight, heavy duty termination. A further need has existed for connecting wire rope terminations to mining and other equipment quickly and safely. For example, for connecting to mining rigging, such as a dragline bucket rigging for open pit mining or operations in other industries. A further need has existed for a method to create wire rope terminations which result in great strength. The present invention meets these needs.

SUMMARY

The invention provides a termination for a wire rope made by a process of inserting one end of a wire rope into a mold and placing a crucible with a crucible opening over the mold. The opening is in fluid communication with the crucible opening. Exothermic metallic material is added to the crucible. The exothermic metallic material is ignited forming a molten material. The molten material flows into the mold around the wire rope forming a termination capable of sustaining a higher break force than the wire rope.

The invention also provides a termination for a wire rope made by a process with an adhesive.

The termination provides a socket for connecting wire rope to various types of equipment. The socket can include one or more frustroconical wedges for securely holding the wire rope and the termination in the connector. The socket body can also include a protection sled and various ways to connect to the equipment.

BRIEF DESCRIPTION OF THE DRAWINGS

In the detailed description of the preferred embodiments presented below, reference is made to the accompanying drawings.

FIG. 6b depicts a side view of an alternate embodiment of a socket usable with the termination.

The present embodiments are detailed below with reference to the listed Figures.

DETAILED DESCRIPTION OF THE PREFERRED EMBODIMENTS

Before explaining the present embodiments in detail, it is to be understood that the embodiments are not limited to the particular descriptions and that the embodiments can be practiced or carried out in various ways.

The invention relates to a method for making terminations on wire rope for use on dragline buckets, or similar earth relocating components.

The termination described herein is made by a labor saving process for use with mining equipment. The termination for wire rope is lighter than conventional terminations used on drag lines in the mining industry, but has the same or greater strength.

The termination and connection for wire rope for the mining industry must be capable of sustaining a large break force. The termination and connection of the present invention weighs appreciably less than similarly sized wire ropes with typical terminations and connections, up to or exceeding 50% less. For example, a current style termination and connection could weigh 6000 pounds for a 4-⅜ inch diameter sire ripe. In contrast certain embodiments of the invention utilize a termination and connection weighing only about 1500-2800 pounds for the same diameter wire rope.

In the preferred embodiment, the terminations are for use with wire ropes with a diameter between ¼ inches and 7 inches. The terminations will work equally well with smaller and larger diameter wire rope. Typical wire ropes are made of steel, alloys of steel and combinations thereof. The wire rope can be a single strand rope or a multi-strand rope.

Figure 1:
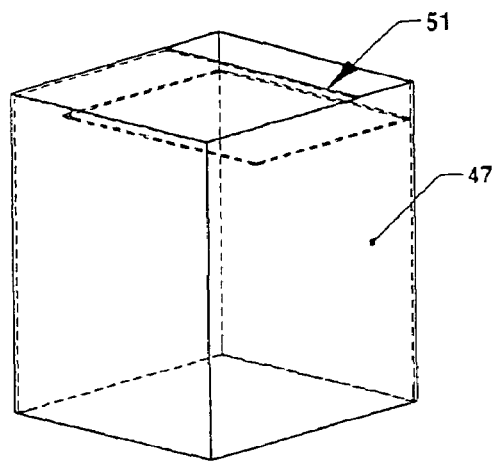
FIG. 1 depicts an exploded isometric view of the apparatus used in the method for making a termination for a wire rope using an exothermic metallic material.
Figure 1:
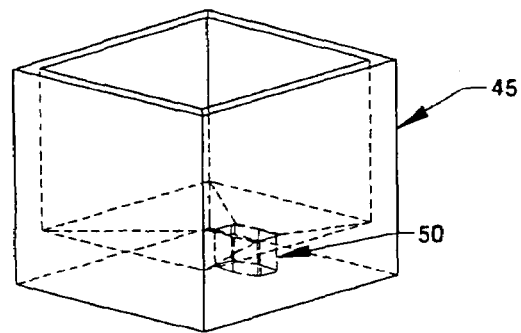
Figure 1:
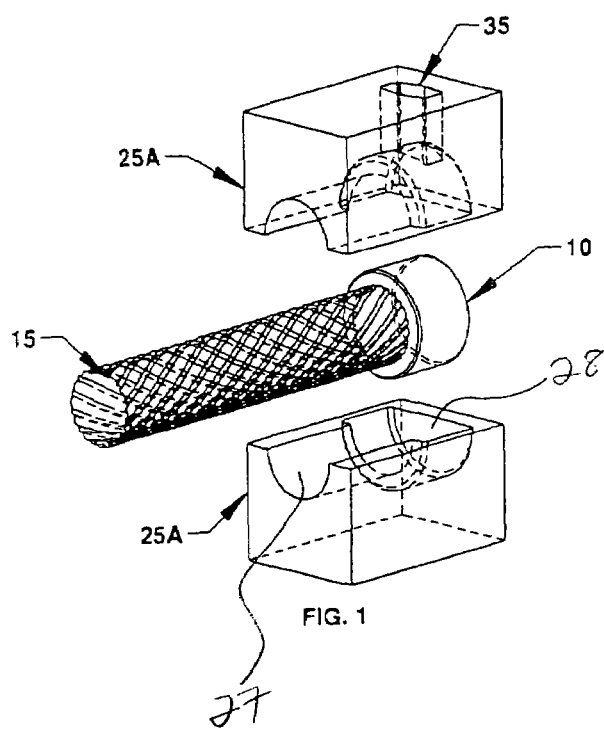

The terminations are made using the equipment of FIG. 1. In a first embodiment, the termination (10) is formed on the end of a wire rope (15) using an exothermic metallic material. In an alternative embodiment, a liquid adhesive can be used to make the termination for the wire rope. The termination formed from the liquid adhesive has additional safety advantages as the termination can be made without heat in the field, preventing burns to workers, which is a much needed benefit.

For terminations made using the exothermic metallic material, one end of the wire rope is inserted into a mold (25). FIG. 1 depicts the mold (25) as a two part mold with a top part (25a) and a bottom part (25b), but a one piece mold can also be used. For large diameter wire ropes, a three piece mold may be used. In this embodiment, the top half of the mold is segmented along the axis of the wire rope opening (27). For extremely large diameter ropes, a several piece mold may be used.

The pieces of mold (25) are held together with toggle-type latches (not shown) spaced around the periphery of the mold. In the preferred embodiment, using two pieces for the mold, there are four latches, two on each side. For the preferred embodiment where the mold is made in three pieces, six latches are used, two on each side and two on the top to hold the top two pieces of the top section of the mold together. The latches are placed so that leakage of molten metal between the seams of the pieces of the mold and down the access of the wire rope is minimized or preferably prevented.

The mold has a mold opening (35). The mold opening can be rectangular, but an elliptical shape or round shape or other shape can be used. The opening should have a diameter that is adequate to permit molten metal to flow into the mold.

The mold has a cavity formed with two connected chambers, a wire rope opening (27) and a termination cavity (28). Wire rope opening (27) is cylindrical and formed to the diameter of the wire rope. Termination cavity (28) in the preferred embodiment is also cylindrical having a diameter approximately two inches greater than the diameter of wire rope (15). The dimensions of the termination cavity are a matter of design choice. In the preferred embodiment of a termination cavity for a 4½-inch diameter wire rope, the cavity is 7¾ inches in diameter and 4 inches long The termination cavity can have a conical, cylindrical, or even rectangular shape. The cavity dictates the resultant shape of the termination. For example, the termination can include a hole perpendicular to the axis of the wire rope form or form a particular shape for connection to other equipment dependent on the shape of the termination cavity.

The external shape of the mold can be any functional shape but is preferably rectangular. The overall external dimensions of the mold of a preferred embodiment are between about 6 inches and about 20 inches; 10 inches is a preferred example. The width of the mold of a preferred embodiment can range from about 6 to about 16 inches; 8 inches is a preferred example. The length of a preferred embodiment can range from about 8 to about 24 inches; 12 inches is a preferred example.

The mold is preferably made of graphite or other materials that are very heat resistant.

Figure 2:
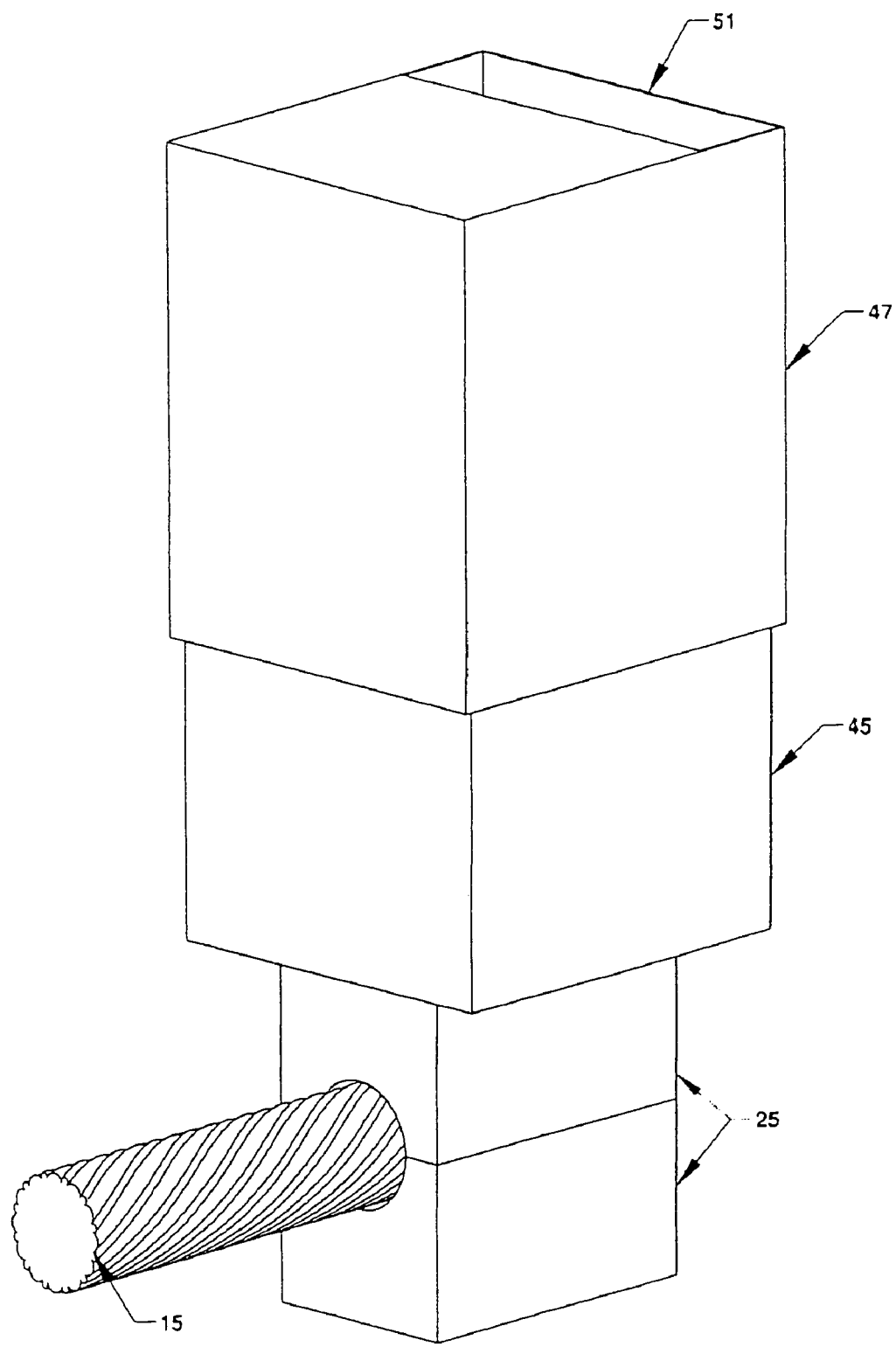
FIG. 2 depicts an isometric view of the apparatus used in the method.

FIG. 2 shows an isometric view of wire rope (15) inserted into mold (25). FIG. 2 also shows a crucible (45), baffle (47) and baffle opening (51).

Figure 3:
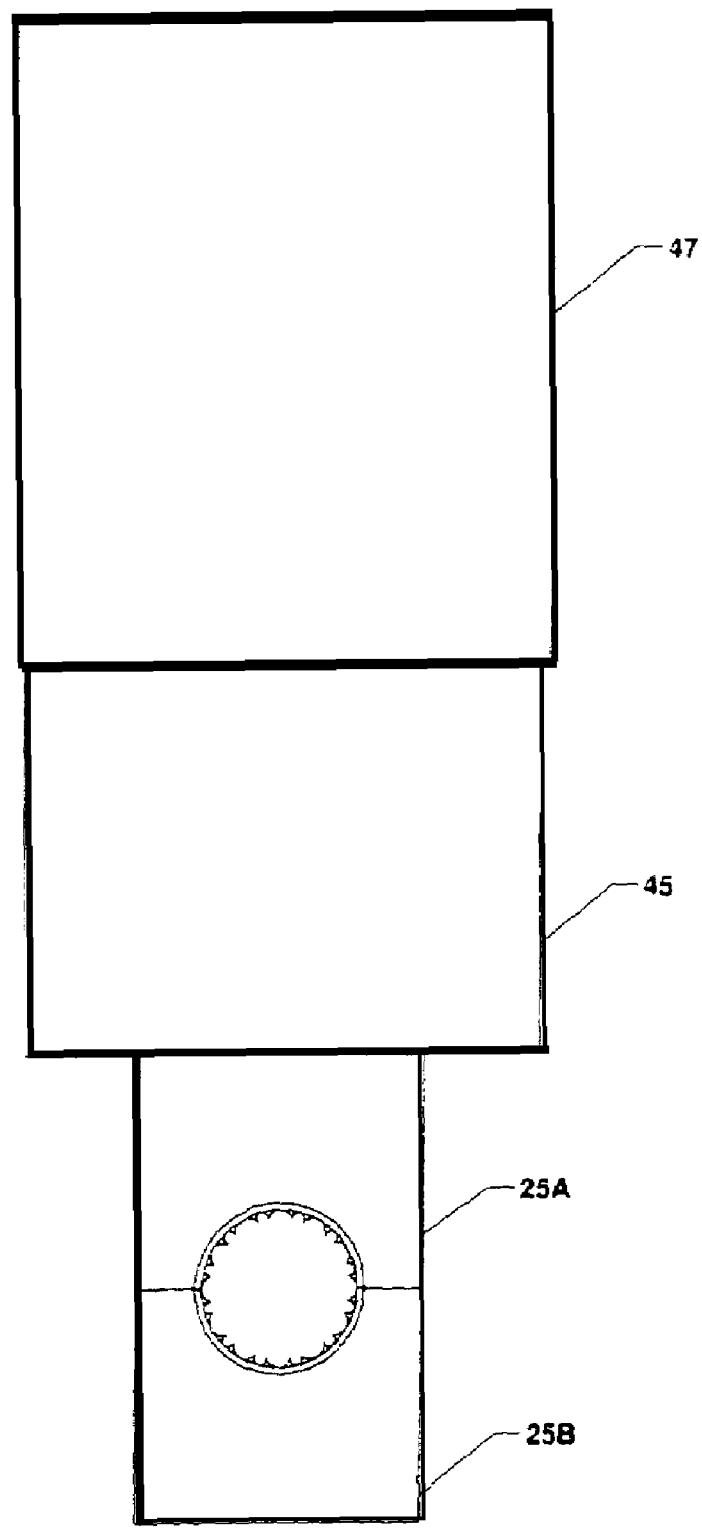
FIG. 3 depicts a front view of the assembled apparatus used in the method.

FIG. 3 shows a front view of the baffle (47) and crucible (45) with the mold (25) and a preferable circular opening for engaging the wire rope.

Figure 4:
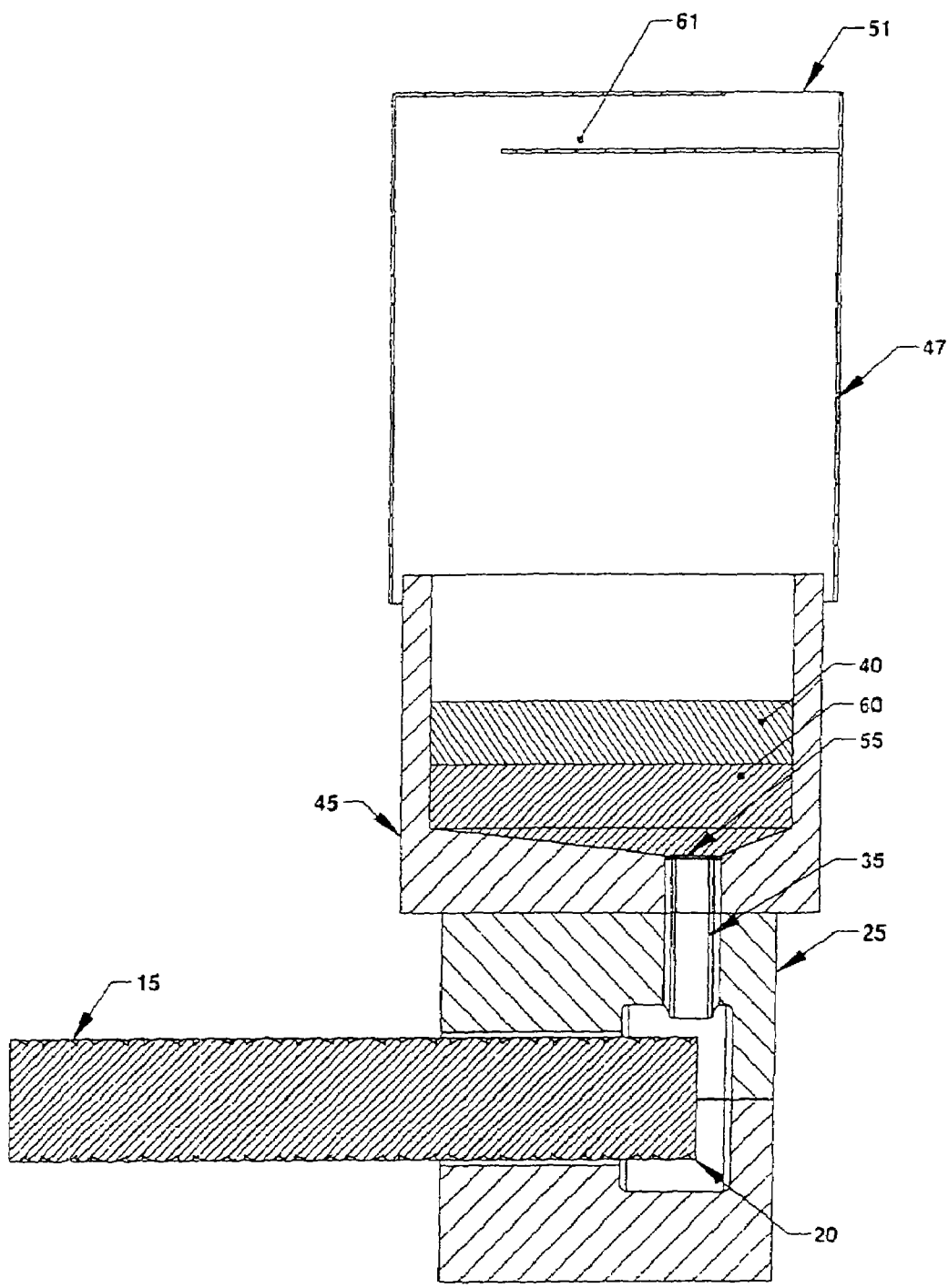
FIG. 4 depicts a cross-sectional side view of the assembled apparatus used in the method.

FIG. 4 depicts a cross-sectional view of the mold, crucible and wire rope.

The crucible provides a reaction chamber for the exothermic material. The crucible dimensions preferably coincide with or are slightly larger than the dimensions of the mold. The dimensions of the crucible of a preferred embodiment are between 10 and 18 inches in height (preferably 12 inches), between 10 and 20 inches in width (preferably 14.5 inches), and between 10 and 30 inches in length (preferably 15 inches). In the preferred embodiment, the walls of the crucible are one inch thick. The floor of the crucible is angled to assist the molten metal flowing out of the crucible through crucible opening (50). The crucible can have a cylindrical shape, a rectangular shape, but generally it is hollow to receive material. The crucible opening has a shape that can be rectangular, ellipsoid, or another usable shape for flowing molten metal into the crucible. The crucible is preferably made of graphite or a heat resistant material that will not deform in the presence of high heat.

A separator (55) is disposed over the crucible opening (50). The purpose of the separator is to keep the exothermic metallic material separate from the mold until ignition of the exothermic metallic material. Typically, separator (55) is a mild steel material; however, any sacrificial material can be used. In a preferred embodiment, the separator has a width between 2 inches and 6 inches in width and a length between 4 inches and 8 inches with a thickness that can range in a corresponding manner. In a preferred embodiment, the thickness of the separator is 10 gauge.

The terminations are made using an exothermic metallic material (40) that is placed into the crucible. The exothermic metallic material is preferably a powdered metallic material. Examples of usable powdered metals include aluminum, copper, tin, alloys of aluminum and alloys of copper, oxides of these metals, particularly including copper oxide. The material can be granules, a powder, or small metal chips. Different sizes of granules, powder or small metal chips can be used in the same crucible. In the preferred embodiment, the material is provided in two phases. The first phase has a fine granularity to promote ease of ignition. The second phase has a coarse granularity to slow burning of the material and provide for adequate bulk to sustain the reaction. In the preferred embodiment, the first phase has granules of approximately $1/100$ of an inch in diameter and the second phase granules have the size of approximately $1/10$ an inch in diameter. In the preferred embodiment, the exothermic metallic material is sold under the trademark "Cad Weld", available from ERICO, Inc. of Solom, Ohio.

A baffle (47) is inserted over the crucible (45) to contain the heat and direct any resulting vapors out a baffle opening (51). The baffle is preferably the same of similar shape to that of the crucible. The baffle is preferably made from steel plate. As shown in FIG. 4, the baffle (47) has at least one internal baffle (61) for deflecting the heat and hot reaction gasses from the crucible.

In a preferred embodiment, the baffle can have a length ranging between 11 inches to 31 inches, a width ranging between 11 inches to 21 inches, and a height ranging between 11 inches to 19 inches in length. The preferred dimensions are 16 inches in length, 15 inches in width, and 18 inches in height. The preferred thickness of the baffle is 10 gauge.

The process of making a termination in the preferred embodiment begins by clamping the mold together by closing the appropriate toggle clamps. Crucible (45) and baffle (47) are then appropriately assembled. Assembly requires insertion of separator (55) in between crucible (45) and termination cavity (28). Crucible (45) and mold (25) must be positioned so that ducted communication, through separator (55) is achieved.

In the preferred embodiment, the end of wire rope (20) is cleaned before the termination is formed. The cleaning step can be performed by any normal means of cleaning a substance. The preferred methods for cleaning are either by using a torch, by using chemicals to remove dirt, and combinations thereof.

After cleaning, wire rope (15) is inserted into wire rope opening (27) far enough to extend into termination cavity (28). In the preferred embodiment of the method, the wire rope is extended approximately two thirds of the width of termination cavity (28).

Exothermic metallic material (40) is then added to crucible (45) in at least one phase. When additional phases of exothermic metallic material (40) are desired in crucible (45), the bulk phases are added first and allowed to settle. The fine phases are then added and allowed to settle.

The exothermic metallic material (40) is kindled in the crucible (45). The exothermic metallic material (40) can be kindled using a striker, a torch, a flame, or other similar heat sources, and combinations thereof. Once kindled, the exothermic metallic material (40) burns very hot and very fast. The exothermic metallic material forms a ductile and malleable material and liquefies the separator (55) forming a molten material (60).

Molten material (60) flows into mold (25) through mold opening (35) and comes into contact with end (20) of wire rope (15). Molten material (60) is of such a temperature that is partially melts and fuses to the wire rope. Molten material (60) takes the form of mold (25) around end (20) forming termination (10).

Molten material (60) is allowed to cool which in the preferred embodiment can take approximately 15 minutes. Crucible (45) and baffle (47) are then removed from mold (25). Mold 25 is then separated into pieces by disconnecting the latches which hold the pieces of the mold together. If the mold is a single piece, it may need to be broken away from the termination. In cooling, exothermic material (60) slightly contracts, allowing the pieces of the mold to be removed easily.

The resultant termination (10) is lighter than conventional terminations and is typically capable of sustaining a higher break force than the wire rope.

A termination according to the present invention may be made using a liquid adhesive.

If the termination is formed using a liquid adhesive, the wire rope first end is place in a mold. A liquid adhesive is then poured into the mold (25) through the mold opening (35) covering the end of the wire rope. The liquid adhesive may need to be heated to room temperature if the method is performed in a cold climate. Examples of usable liquid adhesives include an epoxy, such as a Devcon™ aluminum epoxies from Illinois Tool Work, of Devcon, Ill. Epoxies from 3-M of Minneapolis, Minn. are also contemplated as usable herein, as well as other epoxies that are strong and bond to steel.

The liquid adhesive is allowed to cure in the mold (25) forming a cured termination typically capable of sustaining a higher break force than the wire rope.

In the preferred embodiment the formed termination is inserted into a socket. The socket has an equipment connector on one end adapted to engage mining equipment and a wire rope connector on the other end adapted to engage the termination. Of course, the termination provided by the preferred embodiments of the invention does not necessarily need to be inserted into a socket to operate and is useful by itself in other applications which do not require a socket.

Figure 5:
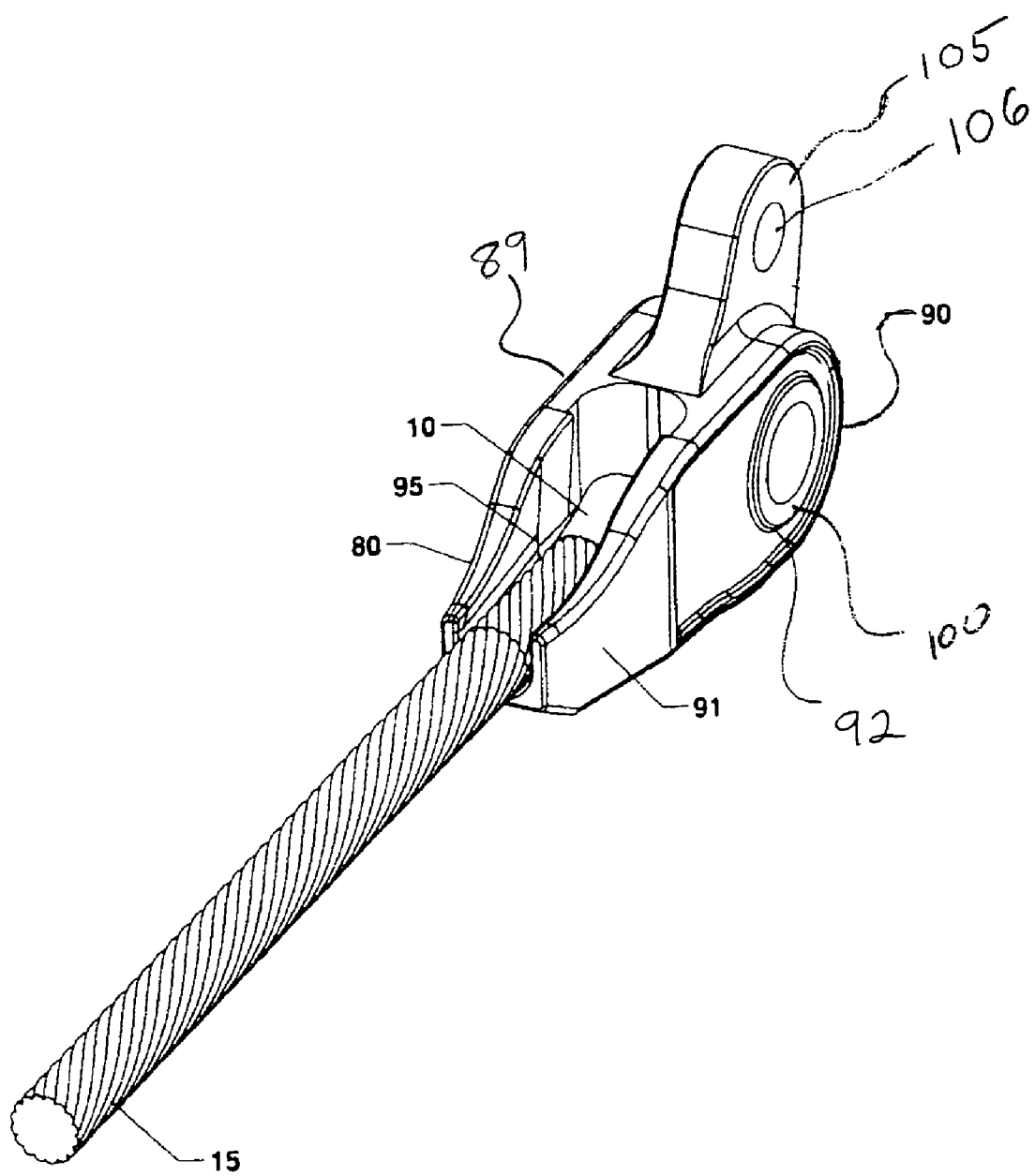
FIG. 5 depicts a perspective view of a socket usable with the termination.

FIG. 5 shows the wire rope with termination engaging a socket (89). The socket has a first connector end (90) adapted to engage mining equipment; and a second connector end (80) to engage the termination (10) on wire rope (15). First connector end (90) includes hole (92), connector (105) and connector hole (106). Hole (92) is sized to include a bushing (100) for connection to mining equipment. Connector hole (106) is similarly sized for connection to the mining equipment. Second connector end (80) includes an upward facing opening (95) which is sized to permit an insertion of wire rope (15) and termination (10).

Socket (89) is preferably formed from ANSI 4140 steel or EN30B material. The dimensions of socket (89) are a matter of engineering choice. However, in the preferred embodiment for a wire rope of 4½ inch diameter, socket (117) is approximately 35 inches long and 13¼ inches wide.

Figure 6A:
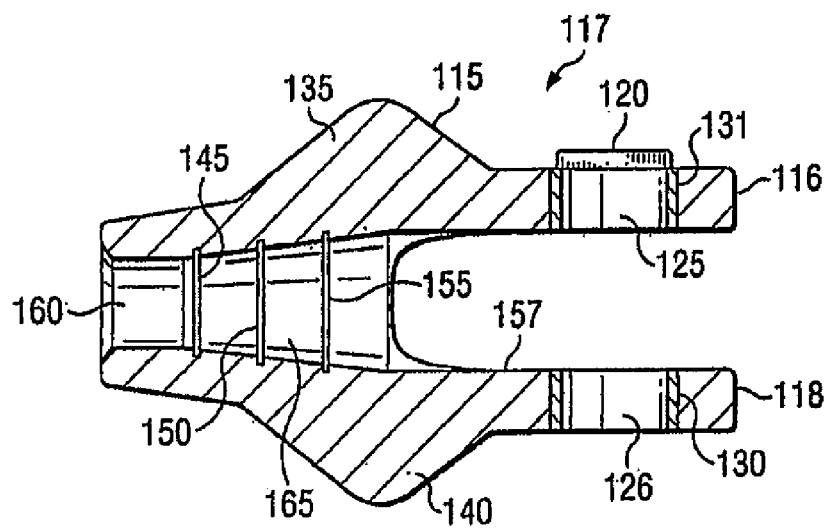
FIG. 6a is a cutaway plan view of an alternate embodiment of a socket usable with the termination.

Moving to FIG. 6a, an alternate embodiment of a socket is shown as socket (117). Socket (117) has body (115). In the preferred embodiment, body (115) is formed from ANSI 4140 steel or EN30B material. First connector end (90) comprises socket ear (116) and socket ear (118) which are used for connection to mining equipment. Socket ear (116) includes hole (125). Similarly, socket ear (118) includes hole (130). Copper alloy bushing (131) is placed in hole (125). Similarly, copper alloy bushing (130) is placed in hole (126). The size and composition of the bushings are a matter of engineering choice.

Body (115) includes ear support (135) and ear support (140). Ear support (135) and ear support (140) strengthen body (115) to prevent spreading of the ears during operation. Guide set (120) is used during operation of the mining equipment to locate a connector (not shown) during operation. The inclusion of the ear supports and guide set are optional depending on the forces applied to the system and connection pins used in operation.

Body (115) includes a bore (160) opening into frustroconical bore (165). Bore (160) is approximately the same diameter as wire rope (15). Frustroconical bore (165) includes circumferential slots (145), (150) and (155). The circumferential slots allow for lubrication of the frustroconical wedges (not yet shown). The inclusion of the circumferential slots is optional.

Body (115) further includes lateral opening (157). Lateral opening (157) is sized to allow entry and exit of the termination.

FIG. 6b shows cradles (161) and (162) formed in body (115) of socket (117). The cradles are provided in the preferred embodiment to reduce weight and are optional.

Figure 7:
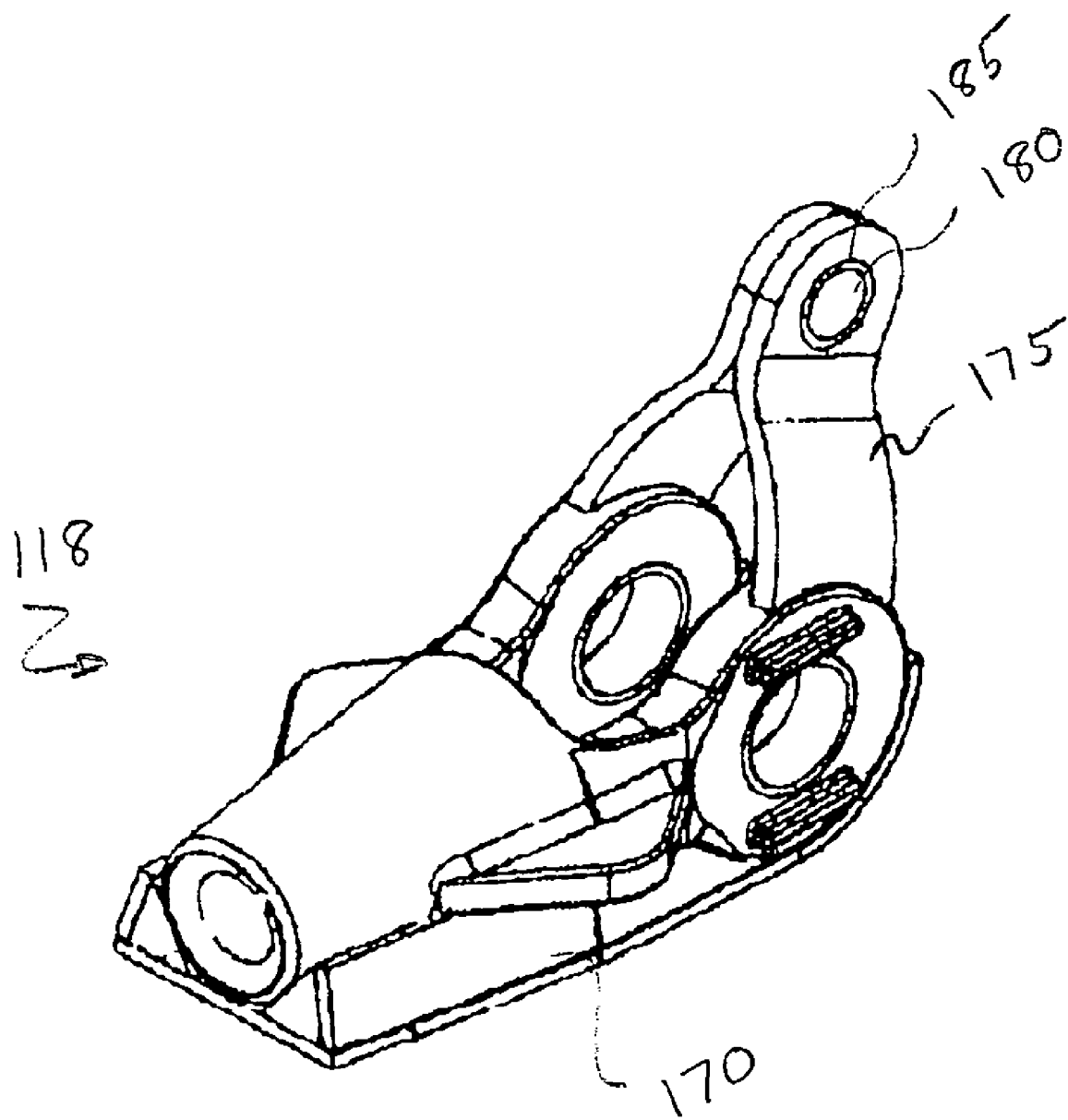
FIG. 7 depicts an isometric view of an alternate embodiment of a socket usable with the termination.

FIG. 7 shows an alternate embodiment of the socket for the termination, socket (118). Socket (118) includes upward connector (175) for connection to mining equipment. Upward connector (175) includes through hole (180) and bushing (185). Socket (118) also includes sled (170). In the preferred embodiment, sled (170) is welded to socket (118) to protect the socket and its internal pieces from the elements during mining operations.

Figure 8A:
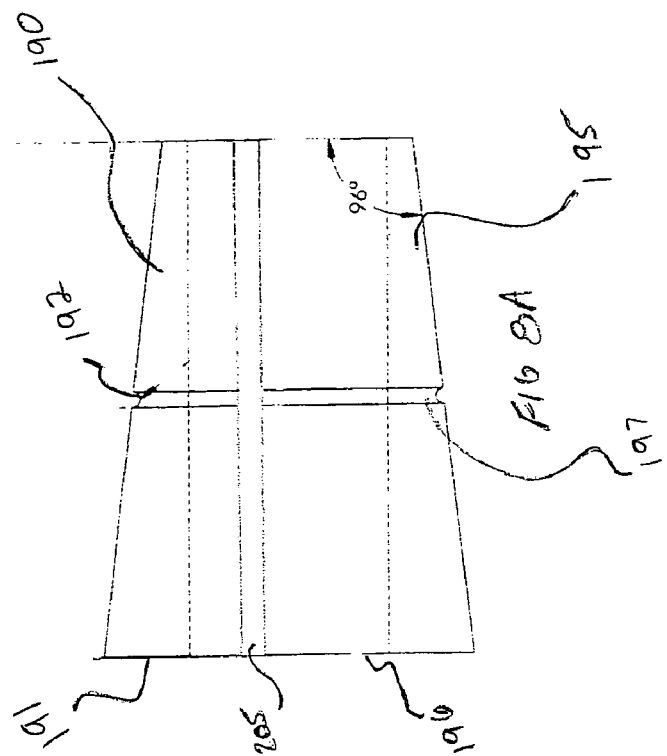
FIG. 8a depicts a side view of two frustroconical wedges usable with the socket of the present invention.
Figure 8B:
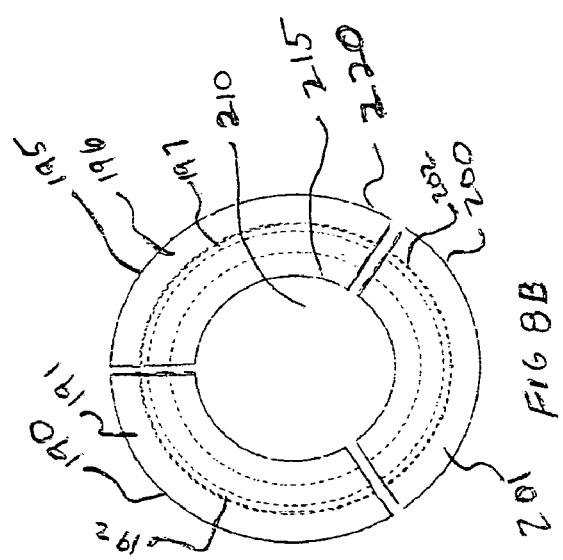
FIG. 8b depicts a plan view of three frustroconical wedges used with the termination of the present invention.
Figure 3:
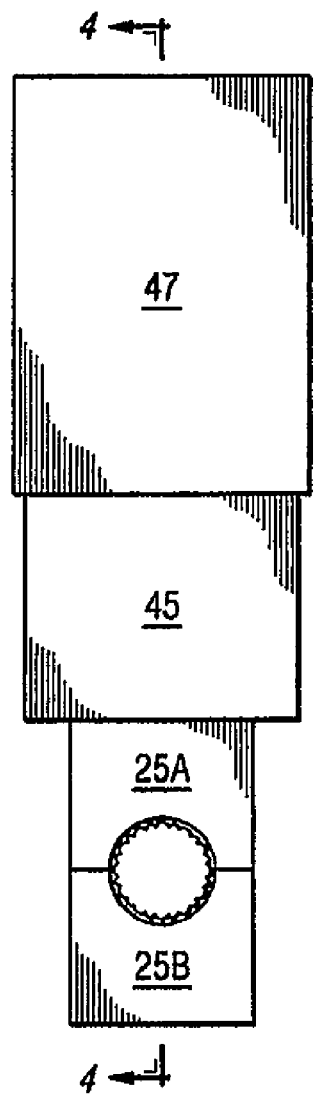
Figure 4:
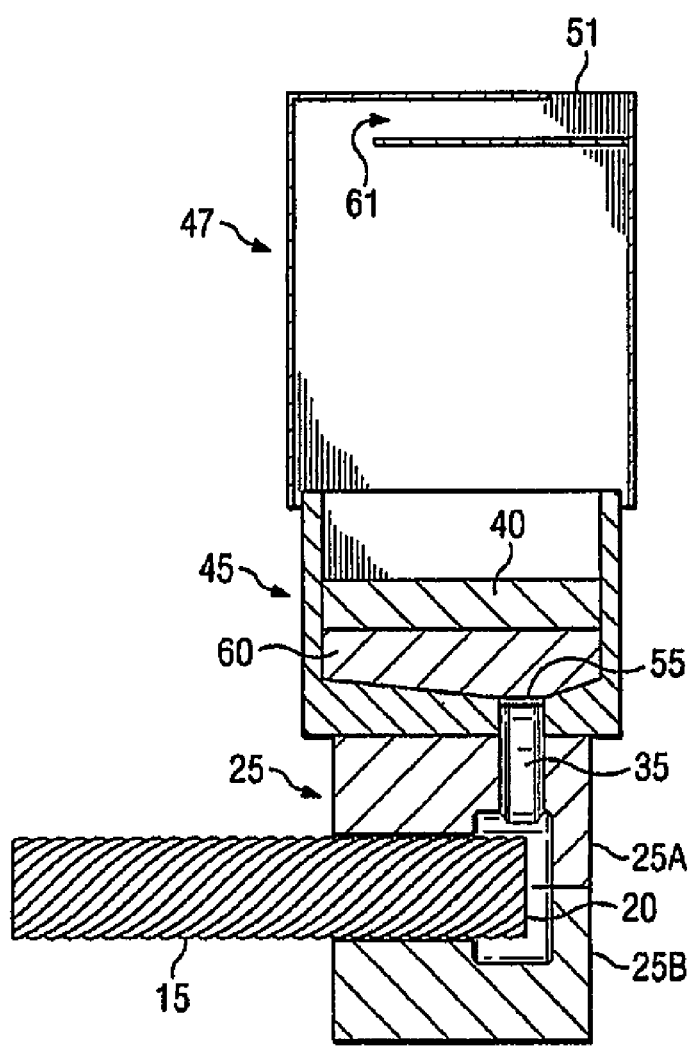
Figure 5:
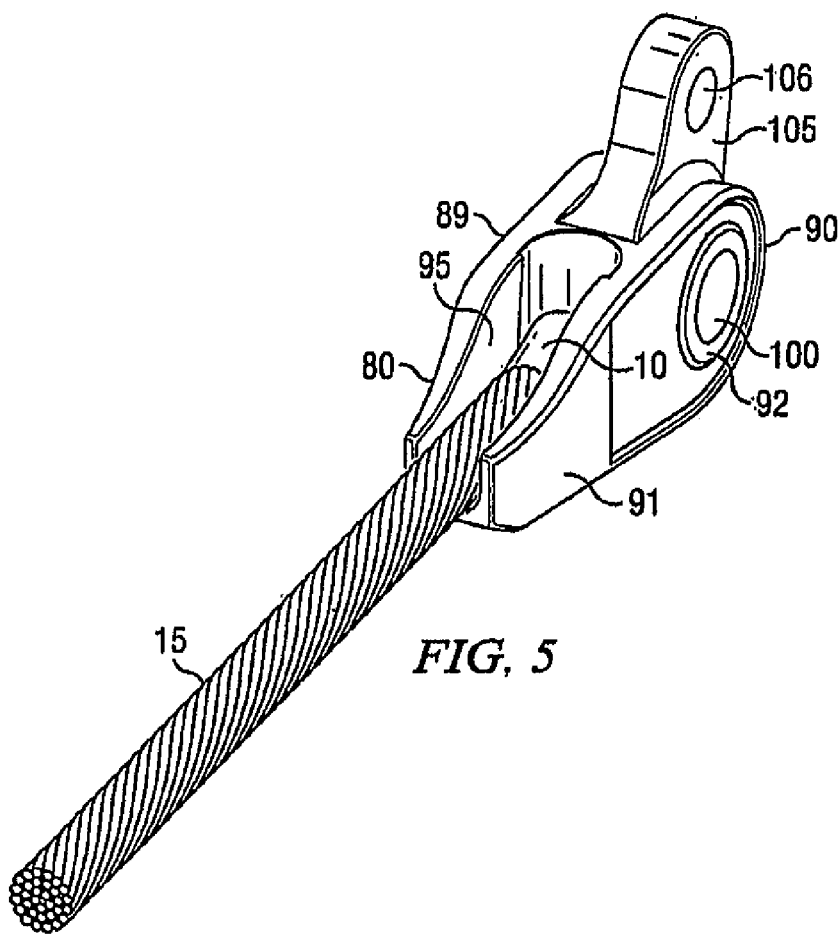

FIGS. 8a and 8b show frustroconical wedges (190), (195) and (200). The frustroconical wedges are designed to fit into frustroconical bore (165) and around wire rope (15). Frustroconical wedge (190) includes surface slot (192). Similarly, frustroconical wedge (195) includes surface slot (197) and frustroconical wedge (200) includes surface slot (202). The surface slots are provided to allow a circular retaining tie to be applied to the frustroconical wedges to hold them together around wire rope (15) during insertion into frustroconical bore (165).

In the preferred embodiment, of frustroconical wedges for use with a 4½ inch wire rope, each frustroconical wedge is 8⅝ inches long and has an outer diameter of 5⅞ inches and in inner diameter of 3⅛ inches. Frustroconical wedge (190) also includes mating surface (195), similarly, frustroconical wedge (191) has mating surface (196) and frustroconical wedge (200) has mating surface (201). Each of the mating surfaces is designed to contact the termination during operation of the invention.

FIG. 8b shows that the three frustroconical wedges of the preferred embodiment are equal in size, being separated by gaps at 120 degrees. For example, gap (205) separates frustroconical wedge (190) and frustroconical wedge (195) when inserted into frustroconical bore (165). The gaps allow for radial contraction of each frustroconical wedge toward the other frustroconical wedges toward the wire rope during operation of the invention. Gap (205) is typically ⅜ of an inch. In the preferred embodiment, there are three equally spaced and identical frustroconical wedges. However, in alternate embodiments, there can be two or more frustroconical wedges divided axially to provide compression forces to wire rope (15).

In the preferred embodiment, the angle of inclination of the frustroconical wedges is about 96 degrees plus or minus 5 degrees. Of course, other angles of inclination will function according to engineering choice.

Each of the dimensions of the frustroconical wedges, gaps and slots can differ, depending on the size of the wire rope and the frustroconical bore. Each of the frustroconical wedges are preferably made of mild steel or an aluminum ally.

Figure 9A:
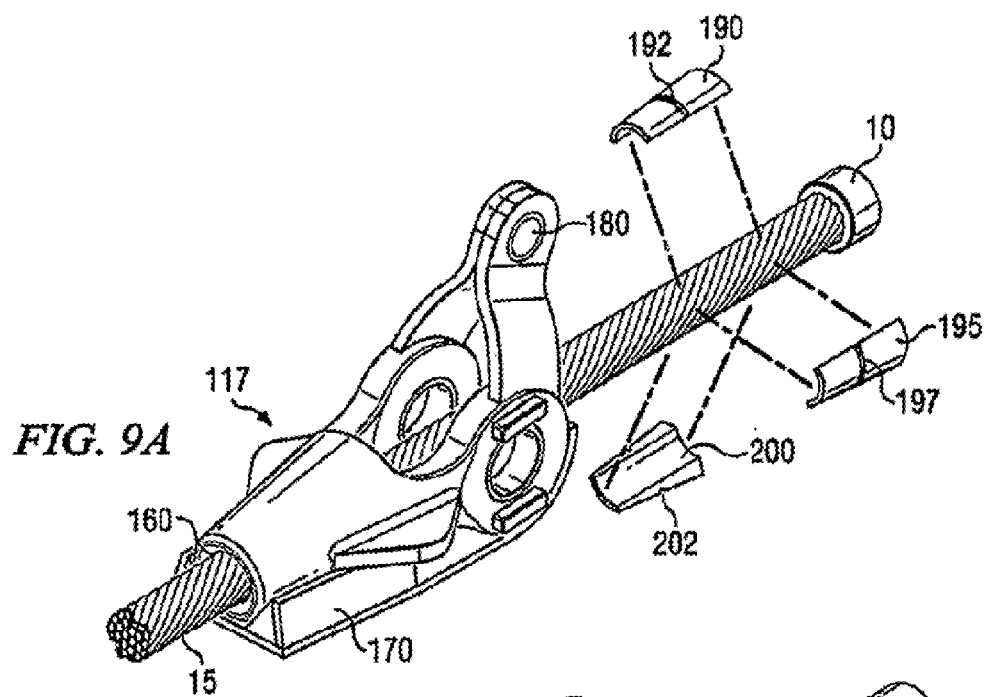
FIG. 9a depicts an isometric assembly view of a wire rope, termination, several frustroconical wedges and a socket.
Figure 9B:
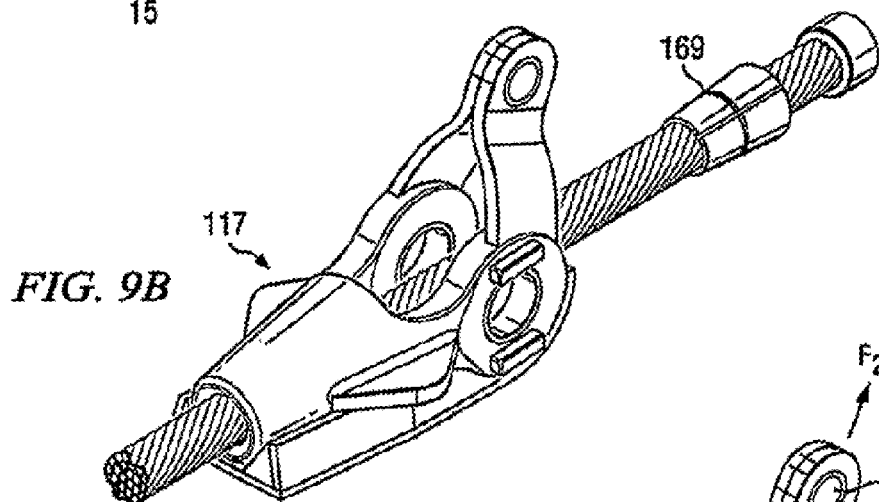
FIG. 9b represents an isometric partially assembled assembly view of a wire rope, termination, several frustroconical wedges and a socket.
Figure 9C:
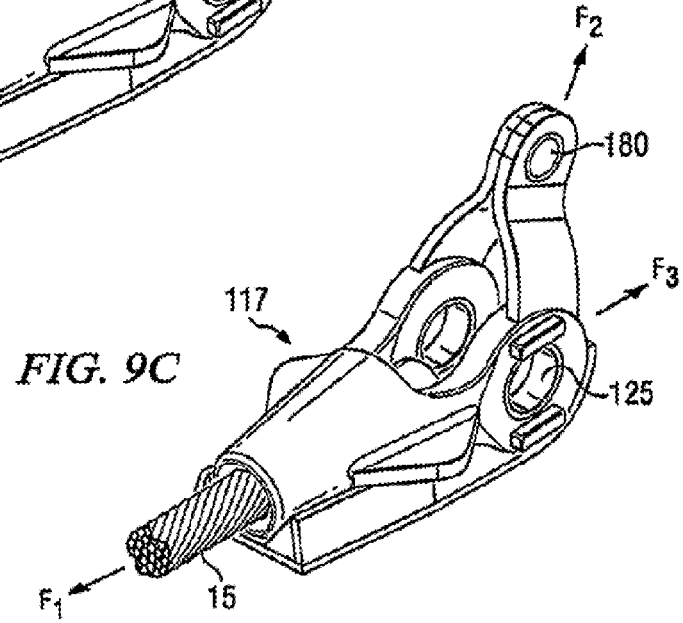
FIG. 9c represents an isometric partially assembled view of a termination, socket and wire rope.

Turning to FIGS. 9a, 9b and 9c, the assembly and usage of the termination, frustroconical wedges and socket can be seen.

FIG. 9 shows an exploded view of socket (117), wire rope (15) and termination (10), as well as frustroconical wedges (190), (195) and (200). In operation, wire rope (15) is threaded through bore (160) in socket (117). Termination (10) is then formed on wire rope (15) as previously described.

Frustroconical wedges (190), (195) and (200) are then assembled onto wire rope (15) as shown in FIG. 9b. A circular retaining tie (169) is then fitted into the surface slots to hold the frustroconical wedges in place on the wire rope. If desired, lubrication is placed in circumferential slots (145), (150) and (155). The wire rope, frustroconical wedges and termination are then pulled into socket (117). The termination seats on mating surfaces (191), (196) and (202) on frustroconical wedges (190), (195) and (200), respectively. In turn, the frustroconical wedges seat inside frustroconical bore (165).

FIG. 9c shows the forces applied to wire rope (15) and socket (117) during operation. Force (F1) is applied axially along the wire rope resisted by force (F3) applied to through hole (125). A lifting force (F2) is then applied to hole (180) resulting in lifting and pulling of mining equipment. Force (F2) and (F3) are resisted by a combination of the friction on the wire rope resulting from the inward radial pressure of the frustroconical wedges on the wire rope. In turn, the inward radial pressure is created by the force (F1) acting through the contact between the termination and the mating surfaces of the frustroconical wedges. As force (F1) is increased, the radial pressure on the wire rope is also increased.

The embodiments have been described in detail with particular reference to certain preferred embodiments thereof, but it will be understood that variations and modifications can be effected within the scope of the embodiments, especially to those skilled in the art.

The invention claimed is:

1. A method for forming a connection to a mining dragline having a solid termination on a wire rope comprising:
   providing a mold with a mold opening and a mold cavity;
   inserting a wire rope into the mold opening;
   flowing a liquefied material into the mold cavity;
   allowing the liquefied material to harden thereby creating the solid termination having a flat concentric thrust exerting surface aligned with the wire rope, joined to the wire rope;
   removably affixing a plurality of axially aligned frustroconical sections adjacent the wire rope;
   providing a flat thrust receiving surface on each frustroconical section at an approximate right angle to an axis of the wire rope;
   abutting the flat concentric thrust exerting surface of the solid termination against the flat thrust receiving surface of each frustroconical section;
   inserting the plurality of axially aligned frustroconical sections into a frustroconical receiver;
   providing a connector in which the frustroconical receiver resides wherein the connector and solid termination are of a combined weight of between about 1500 pounds and 2800 pounds; and wherein;
   the wire rope has a diameter of between about 4 inches and about 7 inches.

2. The method of claim 1 comprising the further step of cleaning the wire rope before the step of inserting.

3. The method of claim 1 wherein the liquefied material is a metal alloy including a plurality of metal constituents.

4. The method of claim 3 wherein the metal alloy includes a copper constituent.

5. The method of claim 3 wherein the metal alloy includes an aluminum constituent.

6. The method of claim 3 wherein the metal alloy includes a tin constituent.

7. The method of claim 3 wherein the metal alloy is formed through the use of a copper oxide.

8. The method of claim 3 wherein the metal alloy is formed through the use of an aluminum oxide.

9. The method of claim 3 wherein the metal alloy is liquefied in a crucible held in ducted communication with the mold cavity.

10. The method of claim 3 wherein the metal alloy is transformed into the liquefied material through melting.

11. The method of claim 3 wherein the metal alloy is transformed into the liquefied material through a thermite reaction.

12. The method of claim 1 including the further steps of:
    providing a crucible held in ducted communication with the mold cavity;
    adding a metallic powder to the crucible; and
    reducing the powder to the liquefied material.

13. The method of claim 12 wherein the crucible is covered.

14. The method of claim 13 wherein the crucible is covered with a baffle including an opening.

15. The method of claim 12 wherein a separator hinders ducted communication between the crucible and the mold cavity.

16. The method of claim 1 wherein the liquefied material is an adhesive.

17. The method of claim 1 wherein the liquefied material is an epoxy.

18. The method of claim 1 further comprising the step of removing the mold after the liquefied material has hardened.

19. An apparatus for forming a connection to a mining drag rope having a solid termination on the rope comprising:
    a mold having a mold opening and a mold cavity;
    a crucible held in fluid communication with the mold cavity;
    the mold cavity configured to forming the termination to include a generally flat thrust exerting surface concentrically aligned with and extending radially from an axis of the mining drag rope;

a plurality of axially aligned frustroconical sections removably affixed adjacent the mining drag rope;

each axially aligned frustroconical section having a generally flat thrust receiving surface in contact with the generally flat concentric thrust exerting surface;

the mining drag rope having a diameter of between about 4 inches and about 7 inches; and a connector to receive the plurality of axially aligned frustroconical sections wherein the connector, the plurality of axially aligned frustroconical sections and the solid termination are of a combined weight of between about 1500 pounds and 2800 pounds.

20. The apparatus of claim 19 further comprising a cover over the crucible having an open port.

21. The apparatus of claim 19 wherein the mold opening is sized to fit a wire rope.

22. The apparatus of claim 19 wherein the mold cavity is cylindrical.

23. The apparatus of claim 19 wherein the crucible is filled with at least two exothermic reaction constituents comprised of different granularities.

24. The apparatus of claim 19 wherein the crucible is removable from the mold cavity.

25. The apparatus of claim 19 wherein the mold cavity is rectangular.

26. The apparatus of claim 19 wherein the crucible is formed of graphite.

27. The apparatus of claim 19 wherein the mold is formed of graphite.

28. The apparatus of claim 19 further including a separator blocking the fluid communication.

* * * * *

UNITED STATES PATENT AND TRADEMARK OFFICE
CERTIFICATE OF CORRECTION

PATENT NO.         : 7,231,957 B2
APPLICATION NO.    : 11/016940
DATED              : June 19, 2007
INVENTOR(S)        : Gregory et al.

It is certified that error appears in the above-identified patent and that said Letters Patent is hereby corrected as shown below:

The title page showing the illustrative figure should be deleted and substitute with the attached title page.

The drawing sheet, consisting of Fig. 1 – 4 and 7 and 9A-9C, should be deleted and replaced with drawing sheet, consisting of Fig. 1 – 4 and 7 and 9A-9C, as shown on the attached page.

Signed and Sealed this

Twenty-fifth Day of December, 2007

JON W. DUDAS
*Director of the United States Patent and Trademark Office*

(12) United States Patent
Gregory et al.

(10) Patent No.: US 7,231,957 B2
(45) Date of Patent: *Jun. 19, 2007

(54) SYSTEM AND METHOD FOR TERMINATION OF A WIRE ROPE

(75) Inventors: George Robert Gregory, P.O. Box 8912, Tyler, TX (US) 75711; Robert McClure Love, III, Tyler, TX (US)

(73) Assignee: George Robert Gregory, Flint, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 11/016,940

(22) Filed: Dec. 2, 2004

(65) Prior Publication Data
US 2005/0230076 A1 Oct. 20, 2005

Related U.S. Application Data

(63) Continuation-in-part of application No. 10/825,658, filed on Apr. 14, 2004.

(51) Int. Cl.
B23K 23/00 (2006.01)
B29B 13/00 (2006.01)

(52) U.S. Cl. .................. 164/54; 228/234.3; 249/86; 264/259; 264/271.1

(58) Field of Classification Search ............ 164/54; 249/86; 264/259, 265, 271.3; 425/116; 228/234.3
See application file for complete search history.

(56) References Cited

U.S. PATENT DOCUMENTS

| 2,038,535 | A | 4/1936 | Brenizer | |
| 2,151,032 | A | 3/1939 | Jensen | |
| 3,786,554 | A | * | 1/1974 | Little ................. 29/461 |
| 3,844,601 | A | 10/1974 | Rochester, Jr. | |
| 4,317,640 | A | * | 3/1982 | Peeling ................ 403/36 |
| 4,405,083 | A | * | 9/1983 | Charlebois et al. ........ 249/97 |
| 4,602,891 | A | * | 7/1986 | McBride ............... 403/211 |
| 4,881,677 | A | * | 11/1989 | Amos et al. ............ 228/33 |
| 5,211,500 | A | * | 5/1993 | Taknki et al. .......... 403/269 |
| 5,499,448 | A | 3/1996 | Tournier et al. | |
| 6,035,692 | A | 3/2000 | Lucas | |

(Continued)

FOREIGN PATENT DOCUMENTS

ES 2 036 452 * 5/1993

Primary Examiner—Kuang Y. Lin
(74) Attorney, Agent, or Firm—Schultz & Associates

(57) ABSTRACT

The invention provides a termination for a wire rope made by a process of inserting one end of a wire rope into a mold and placing a crucible with a crucible opening over the mold. The mold opening is in fluid communication with the crucible opening. Exothermic metallic material is added to the crucible. The exothermic metallic material is ignited forming a molten material. The molten material flows into the mold around the wire rope forming a termination capable of sustaining a higher break force than the wire rope.

The invention also provides a termination for a wire rope made by a process with an adhesive.

The termination provides a socket for connecting wire rope to various types of equipment. The socket can include one or more frustroconical wedges for securely holding the wire rope and the termination in the connector. The socket body can also include a protection sled and various ways to connect to the equipment.

28 Claims, 9 Drawing Sheets

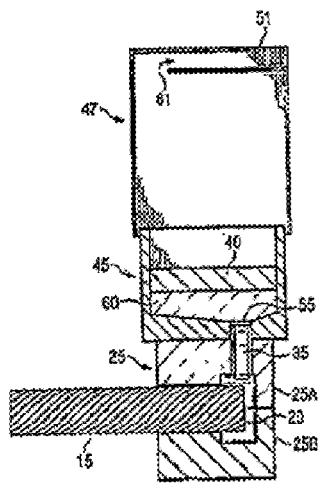
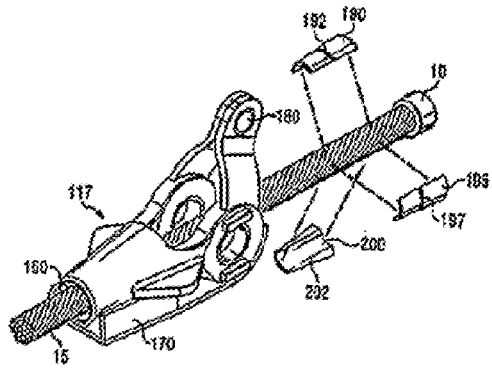

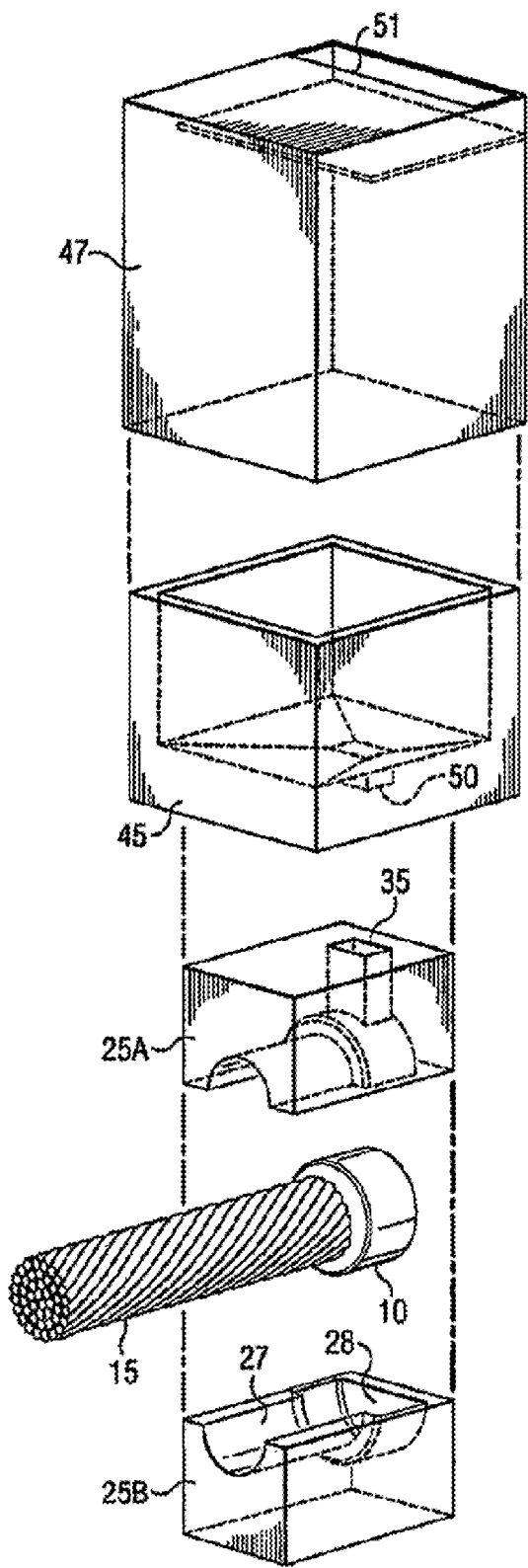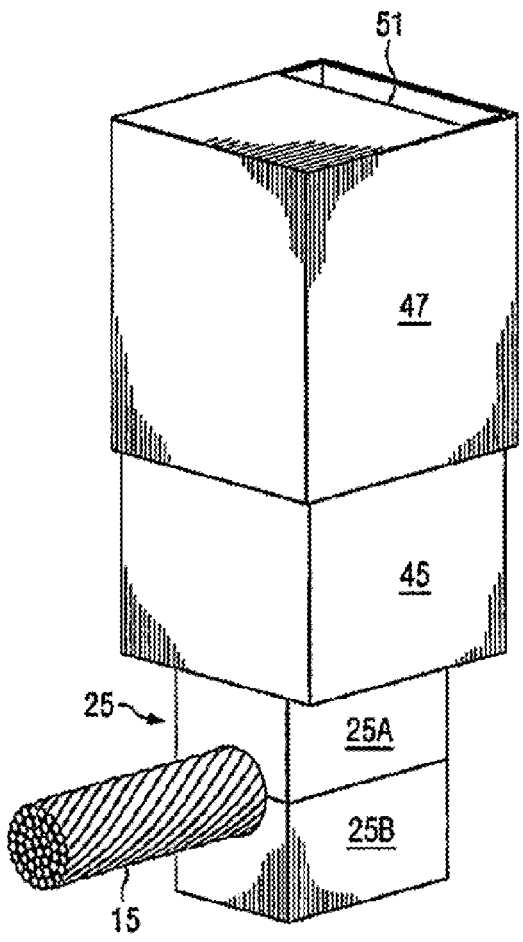
FIG. 1
FIG. 2

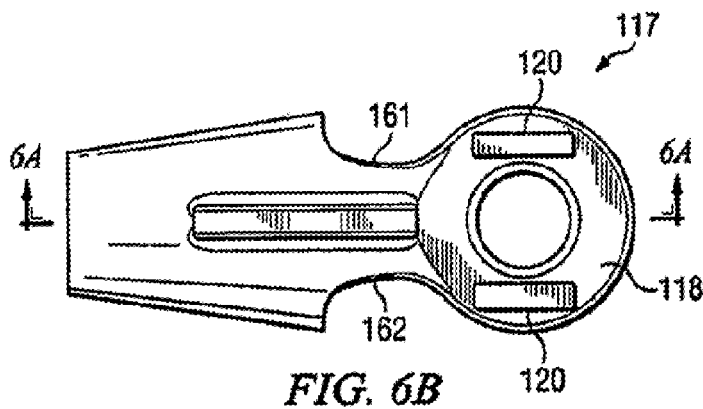
FIG. 6B
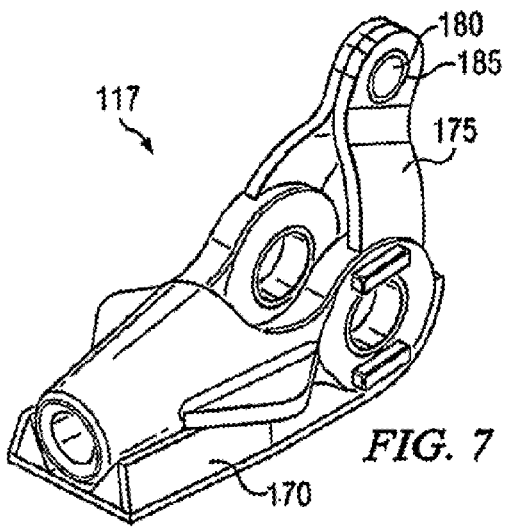
FIG. 7
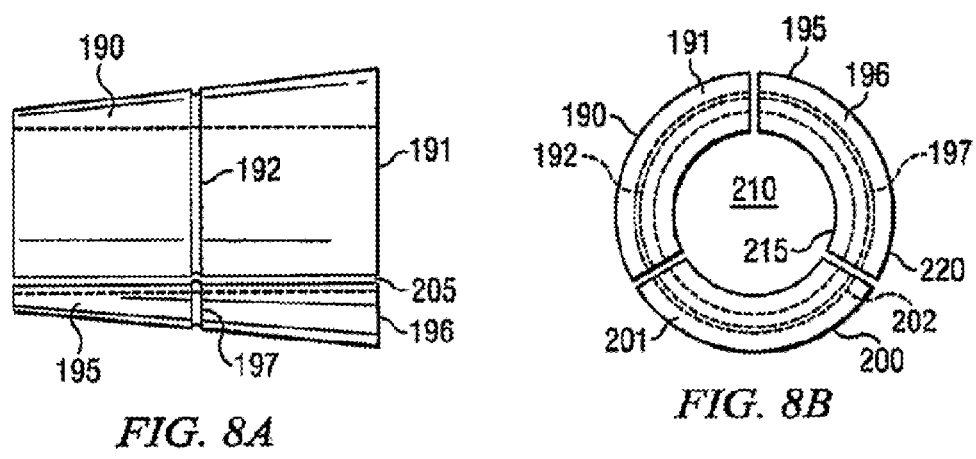
FIG. 8A
FIG. 8B